US012059861B2

(12) United States Patent
Dröge (10) Patent No.: US 12,059,861 B2
(45) Date of Patent: Aug. 13, 2024

(54) WOOD MATERIAL PANEL HOT PRESS AND METHOD FOR OPERATING A WOOD MATERIAL PANEL HOT PRESS

(71) Applicant: SWISS KRONO TEC AG, Lucerne (CH)

(72) Inventor: Peter Dröge, Wittenberge (DE)

(73) Assignee: SWISS KRONO TEC AG, Lucerne (CH)

( * ) Notice: Subject to any disclaimer, the term of this patent is extended or adjusted under 35 U.S.C. 154(b) by 176 days.

(21) Appl. No.: 17/375,452

(22) Filed: Jul. 14, 2021

(65) Prior Publication Data

US 2021/0339495 A1 Nov. 4, 2021

Related U.S. Application Data

(63) Continuation of application No. 16/324,819, filed as application No. PCT/EP2017/071909 on Aug. 31, 2017, now Pat. No. 11,097,502.

(30) Foreign Application Priority Data

Sep. 7, 2016 (EP) .................................... 16187661

(51) Int. Cl.
*B30B 5/06* (2006.01)
*B27N 3/24* (2006.01)
(Continued)

(52) U.S. Cl.
CPC ................. *B30B 5/06* (2013.01); *B27N 3/24* (2013.01); *B30B 15/148* (2013.01); *G01N 25/72* (2013.01); *B27N 1/029* (2013.01)

(58) Field of Classification Search
CPC ........... B30B 5/06; B30B 15/148; B27D 1/02; B27D 1/025; B27D 3/00; B27D 3/02;
(Continued)

(56) References Cited

U.S. PATENT DOCUMENTS 3,942,929 A     3/1976   De Mets
5,112,209 A * 5/1992   Ahrweiler ................ B27N 3/24
                                                                                                                                                                     425/371
(Continued)

FOREIGN PATENT DOCUMENTS

CN        103341901      10/2013
DE           3907617       8/1990
(Continued)

OTHER PUBLICATIONS

Meinlschmidt, "Thermographic detection of defects in wood and wood-based materials", 14th Symposium of Nondestructive Testing of Wood, Hannover, Germany, May 2, 2005, Retrieved from Internet Mar. 12, 2013, 6 pages.
(Continued)

*Primary Examiner* — Jimmy T Nguyen
(74) *Attorney, Agent, or Firm* — Andrew M. Calderon; Calderon Safran & Wright, PC (57) ABSTRACT

The disclosure relates to a wood material panel hot press for producing a wood material panel, wherein the wood material panel hot press has an inlet side and an outlet side, and is designed to press a blank supplied on the inlet side in order to form a wood material panel. According to the invention, a temperature measurement device is provided which is designed to automatically measure the temperature (T) of the wood material panel on the outlet side in a spatially resolved manner.

10 Claims, 5 Drawing Sheets

(51) Int. Cl.
*B30B 15/14* (2006.01)
*G01N 25/72* (2006.01)
*B27N 1/02* (2006.01)

(58) Field of Classification Search
CPC ... B27D 3/04; B27M 1/02; B27N 1/02; B27N 1/029; B27N 3/24; G01N 25/72
USPC .............................. 100/38; 144/242.1, 246.1
See application file for complete search history.

(56) References Cited

U.S. PATENT DOCUMENTS

| | | | |
|---|---|---|---|
| 6,690,016 B1 * | 2/2004 | Watkins | G01N 25/72 |
| | | | 250/341.7 |
| 11,097,502 B2 * | 8/2021 | Dröge | G01N 25/72 |
| 2001/0042834 A1 | 11/2001 | Kenway | |
| 2017/0087892 A1 | 3/2017 | Skorzik et al. | |

FOREIGN PATENT DOCUMENTS

| | | | | |
|---|---|---|---|---|
| DE | 10061389 A1 * | 6/2002 | ............... | B27N 3/24 |
| EP | 1526377 | 4/2005 | | |
| EP | 1526377 A1 * | 4/2005 | ............. | G01N 25/72 |
| EP | 2927003 | 10/2015 | | |
| EP | 2977157 | 1/2016 | | |
| JP | S55085824 | 6/1980 | | |
| JP | H04501830 | 4/1992 | | |
| JP | H10151241 | 6/1998 | | |
| JP | 2002502968 | 1/2002 | | |
| JP | 200252509 | 8/2002 | | |
| JP | 2003154500 | 5/2003 | | |
| JP | S49030754 | 5/2012 | | |
| SU | 856851 | 8/1981 | | |
| WO | 0135086 | 5/2001 | | |
| WO | 2009071738 | 6/2009 | | |
| WO | 2015149894 | 10/2015 | | |

OTHER PUBLICATIONS

Berglind et al. "Detection of glue deficiency in laminated wood with pulse thermography", Journal of Wood Science, Jun. 30, 2003, pp. 216-220.

International Search Report in related International Application No. PCT/EP2017/071909 dated Oct. 31, 2017, 9 pages.

Written Opinion in related International Application No. PCT/EP2017/071909 dated Oct. 31, 2017, 7 pages.

* cited by examiner

WOOD MATERIAL PANEL HOT PRESS AND METHOD FOR OPERATING A WOOD MATERIAL PANEL HOT PRESS

FIELD OF THE INVENTION

The invention relates to a wood material panel hot press for producing a wood material panel. According to a second aspect, the invention relates to a method for operating such a wood material panel hot press.

DISCUSSION OF BACKGROUND INFORMATION

This type of wood material panel hot press is used to press a fiber cake into a wood material panel, for example in the production of HDF panels. This type of hot press operates continuously but is stopped if, for instance, a defect must be repaired or a wood material panel with a different panel thickness is to be produced.

It is beneficial to be able to operate this type of hot press at the highest possible speed. However, if the feed speed is too high, defects will occur in the wood material panels produced. For instance, material defects near the surface—so-called splitters—may occur due to the presence of vapor bubbles in the resulting wood material panel, which cause the material to rupture. The optimal process parameters for operating this type of wood material panel hot press are selected by the machine operators with the aid of empirical values. It is not known whether the optimal feed speed can be achieved using this method.

It has been proposed to reduce waste during the start-up process by adjusting the heat output of the hot press rather than the temperature of a press belt of the wood material panel hot press. This approach does reduce waste; however, an even greater reduction of waste is desirable.

EP 1 526 377 A1 describes a wood material panel hot press according to the preamble. The thermographic camera is used to identify and screen out defective wood material panels, or to monitor the speed at which the hot press is working. This is achieved by comparing thermograms that have been recorded with the infrared camera to reference thermograms. This can prevent the further processing of defective wood material panels and avoid waste caused by an incorrect flow rate. It helps further reduce the rate of waste. WO 01/35086 A2 describes a device for the contact-less inspection of test specimens which makes use of a thermographic camera to detect surface defects.

In P. Meinlschmidt's paper entitled "Thermographic detection of defects in wood and wood-based materials", from the 14th international symposium of non-destructive testing of wood, Hannover, Germany, 2nd-4th May 2005, he describes that thermography can be used to detect defects in wood material panels.

US 2001/0042834 A1 describes how defects can be detected by producing a computer-generated model following the capture of a first image. The differences between a second captured image and the results calculated on the basis of the model are compared.

EP 2 927 003 A1 describes the detection of the spatial temperature distribution in order to obtain a printed image from a subsequent printing, wherein this printed image changes as little as possible over time. This type of method is suitable for subsequently compensating for, but not preventing, any inhomogeneities in the temperature distribution.

SUMMARY OF THE INVENTION

The invention aims to improve the production of wood material panels.

The invention solves the problem by means of a wood material panel heat press. According to a second aspect, the invention solves the problem by means of a method.

The invention is based on the knowledge that the surface temperature of the wood material panel on the outlet side characterizes the thermal and mechanic processes inside the wood material panel hot press so precisely that it is sufficient for adjusting the process parameters of the wood material panel hot press. This is surprising given that it has been common in the prior art for many years to measure the temperature inside the wood material panel hot press. However, it has been proven that the temperature sensors used up until now are not able to deliver a signal which can be used for carrying out adjustments. Known temperature sensors are located at a relatively large distance from the surface of the wood material panel being produced. In other words, the prior art does not measure the temperature on the surface of the wood material panel, but rather a temperature of the press. If the transfer of heat from the press to the wood material panel changes, this alters the properties of the wood material panel, even if the temperature of the wood material panel hot press remains constant.

It has also been proven that, surprisingly, the surface of the wood material panel on the outlet side may exhibit local temperatures that differ considerably from the rest of the surface. It is thus possible with wood material panel hot presses of the prior art that the temperature measured at a point in the interior does not change but the distribution of the temperature within the wood material panel, and thereby the (local) rate of defects, does.

It has been discovered that the temperature, especially the surface temperature, on the outlet side of the wood material panel grants such an extensive insight into the pressure and temperature conditions in the wood material panel hot press that further measured values for the adjustment of the wood material panel hot press are irrelevant. It is indeed possible to use further measured values for conducting adjustments, but it is not necessary. It is thus beneficial to compensate for temperature differences on the surface of the wood material panel by adjusting at least one process parameter. This improves the homogeneity of the wood material panel along its width direction. The wood material panel hot press can thus be operated with a higher feed speed until it comes across any defects in the wood material panel.

Given that the temperature of the wood material panel is measured immediately, a comparison of these temperatures with a target temperature can be used to establish whether the transfer of heat from the wood material panel hot press to the resulting wood material panel lies within a predetermined target interval, as is intended according to a preferred embodiment. If the actual temperature of the wood material panel, averaged across the width, deviates from the press belt temperature of a press belt of the wood material panel hot press, which has been measured by means of a press belt temperature measurement device that is preferably provided, by more than a predetermined threshold value, a warning signal can be emitted. This indicates that the transfer of heat from the hot press to the wood material panel being produced has been disrupted. This can be counteracted by reducing the feed speed, for example. Alternatively or additionally, a moisture level of the fiber cake can be reduced, for instance by reducing the amount of a liquid it is sprayed with, or stopping this altogether.

If the temperature is measured using a contactless method, contact conditions between a temperature sensor and the wood material panel are irrelevant. The measurement is thus particularly accurate. It has also been proven that the surface properties of the wood material panel change so little that a contactless measurement, for example with an infrared camera, only entails a low degree of systematic measurement uncertainty.

Within the scope of the present description, the wood material panel should be understood especially to mean a wood fiber panel, an HDF panel, an OSB panel or a chipboard. It is especially beneficial if the fiber cake is fed continuously into the system. In other words, it is beneficial if the wood material panel hot press is a continuous press.

The temperature measurement device should be understood especially to mean a device by means of which a measured value can be generated that correlates to the temperature, particularly the surface temperature, of the wood material panel in such a way that this value can be used to deduce the temperature. It is possible, but not necessary, that the temperature measurement device is configured to measure the temperature in terms of a temperature scale. It is especially beneficial if the temperature measurement device indicates the temperature in Kelvin, degrees Celsius or in terms of another temperature scale. However, it is also possible to simply measure a change in temperature in relation to a predetermined reference temperature, such as the temperature of the fiber cake on the inlet side or a random, yet fixed, selected reference temperature. An existing temperature signal, for example an electric or encoded signal, is also sufficient. In this way, the temperature may be represented, for instance, by a voltage, a resistance or a wavelength of the highest spectral density.

The term 'contactless measurement' should be understood to mean that no physical contact between the wood material panel and the measurement device is required to identify the temperature.

The term 'spatially resolved measurement' should be understood to mean that at least three, preferably at least five, especially preferably at least ten measured values are recorded along a width expansion of the wood material panel. It is favorable and represents a preferred embodiment that at least one point exists at which two or more temperature values are recorded in succession in relation to a direction of material flow of the wood material panel through the wood material panel hot press. It is possible and preferable to calculate the average of at least two, preferably more, temperatures that have been successively measured in this manner in order to obtain a measured value for the temperature that does not exhibit much temporal fluctuation.

The temperature measurement device is preferably designed to conduct a spatially resolved measurement of the temperature across at least 80%, in particular at least 90%, preferably 100%, of the full width of the wood material panel.

The process parameter, which may also be known as the method parameter, should be understood particularly to mean an adjustable machine parameter which influences the temperature and/or the temperature distribution of the wood material panel on the outlet side. For example, the process parameter is the feed speed of the fiber cake, the heat output of at least one heating circuit or the pressing force. The process parameter may be a vector, i.e. an ordered n-tuple, such as the vector that comprises (i) the pressing force at different points of the hot press and/or (ii) the heat output of the heating circuit and/or (iii) at least one position of a frame to which the press belt is fixed or a device which transfers a force to the press belt, and/or (iv) a position of a component that transfers a pressing force to the press belt relative to the frame.

The process parameters are especially one, two or more variables that are selected from the list which comprises: the pressing force at a first position; the pressing force at a second position that is different to the first; the pressing force at a third position that is different to the first and the second; the temperature at a first position; the temperature at a second position that is different to the first; the temperature at a third position that is different to the first and the second; the heat output of a first heating strand; the heat output of a second heating strand that is different to the first; the total heat output; the moisture level of the fiber cake; the temperature of the fiber cake; the ambient temperature; and a feed speed at which the wood material panel moves in the direction of material flow. In particular, the feed speed is changed by the adjustment of at least one drive with which the conveyor belt is driven, on which the fiber cake and/or the wood material panel lies.

According to a preferred embodiment, the temperature measurement device is designed to continuously measure the temperature. This should be understood particularly to mean that the temperature is measured repeatedly. In particular, the temperature measurement device in configured to automatically record temperature values at least every ten seconds, preferably every five seconds, especially at least once a second. It has been proven especially beneficial if temperature values are recorded at least five times per second. This enables a rapid reaction to any changes in temperature.

According to a preferred embodiment, the temperature measurement device is designed to measure the temperature with minimum delays. A measurement of temperature with minimum delays should be understood to mean that between the start of the measuring process and the generation of the measurement result, half of the time required for a volume element to go through the wood material panel hot press elapses, wherein a maximum of ten seconds in particular elapses, preferably a maximum of one second. In other words, the measured temperature indicates the current temperature of the wood material panel to a very good approximation, rather than a temperature of the wood material panel some time before. In other words again, the temperature measurement device is designed to measure the temperature in such a way that the measurement of the temperature can be deemed instantaneous to a sufficiently good approximation.

The feature that the temperature measurement device is designed to measure the temperature on the outlet side should be understood particularly to mean that a distance between the point at which the transfer of heat from the hot press to the wood material panel ends and the first point in the direction of material flow at which the temperature is measured is a maximum of 2 m, preferably a maximum of 1 m. The greater the distance between the hot press and the point at which the temperature is measured, the greater the influence of, for example, the convection on the measurement result, such that the informative value of a measurement result obtained over a large distance is not as significant, which is not desirable.

The temperature measurement device comprises an infrared camera. This infrared camera is a video camera, for example, which is designed to capture several images per second. The advantage of an infrared camera is that one measurement cycle can capture a number of individual temperature measurement points. The infrared camera is preferably a CCD camera with a corresponding CCD chip. This CCD chip preferably has at least 200×50 pixels. An infrared camera can be used to quickly and accurately determine the temperature of the wood material panel with a high degree of process reliability.

The wood material panel hot press has a control unit which is configured to automatically conduct a method featuring the steps (a) detecting a first lateral temperature at a first point in a left-hand lateral area of the wood material panel, (b) detecting a second lateral temperature at a second point in a right-hand lateral area of the wood material panel and (c) amending of at least one process parameter of the hot press such that the first lateral temperature approaches the second lateral temperature and, in particular, a difference between the two temperatures decreases. It has been proven that local temperature differences may lead to material defects, such as vapor bubbles.

The changing of the process parameter is an increase of a pressing force on the side with the lower temperature. If the pressing force is increased, the transfer of heat from the wood material panel hot press—especially from a circulating press belt—to the wood material panel becomes more efficient, causing the temperature of the wood material panel to rise. It is surprising that changing the pressing force has a considerable influence on the temperature of the wood material panel because it was initially assumed that the pressing force is already so great during normal operation that a change in the pressing force would not lead to a significant change in the transfer of heat.

Alternatively or additionally, in order to increase the pressing force on the side with the lower temperature, the adjustment of the process parameter may comprise a reduction in the pressing force on the side with the higher temperature.

The wood material panel hot press preferably has a heating device, by means of which the one circulating press belt of the wood material panel hot press can be heated to different local temperatures in its width direction. In particular, the heating device comprises at least two, preferably three, heating zones, which are arranged adjacently to one another and can be controlled or adjusted to different temperatures.

In other words, the adjustment of the process parameter may comprise an increase in the pressing force on the side with the lower temperature relative to the pressing force on the side with the higher temperature. In addition, the adjustment of the process parameter may be or may comprise a local increase in the heat output P and/or temperature T on the side with the lower temperature in relation to the side with the higher temperature. Of course, it is possible for two or more process parameters to be changed such that the first lateral temperature approaches the second lateral temperature.

The left-hand lateral area should be understood particularly to mean the area which extends from the left-hand side of the wood material panel in the direction of material flow to 0.4 times, especially 0.33 times, the width of the wood material panel. Correspondingly, the right-hand lateral area is specifically the area of the wood material panel which extends from the right-hand edge to 0.4 times, especially 0.33 times, of the lateral width.

According to a preferred embodiment, the method includes the steps: a comparison of an actual temperature measured using the temperature measurement device with a predetermined target temperature; and an increase of a feed speed of the fiber cake if the actual temperatures lies above the target temperature by a predetermined differential temperature and/or a decrease of the feed speed if the actual temperature lies below the target temperature by a predetermined second differential temperature. If the actual temperature lies neither above the target temperature by at least the predetermined differential temperature nor below the target temperature by the predetermined second differential temperature, the feed speed preferably remains unchanged.

Alternatively or additionally, the heat output and/or the temperature of the hot press, especially of the press belt, is reduced if the actual temperature lies above the target temperature by the predetermined temperature difference, wherein the heat output and/or the temperature is preferably increased if the actual temperature lies below the target temperature by the predetermined temperature difference.

It is beneficial if the feed speed is at least also adjusted by way of the temperature averaged across the width of the wood material panel. Of course, it is possible that a range of temperature differences is used for the adjustment of the feed speed and the adjustment of the heat output or the temperature of the heat press before a control intervention occurs.

It is beneficial if the first differential temperature and/or the second temperature difference is at most 5 Kelvin. It is especially beneficial if the sum of the temperatures differences is at most 5 Kelvin, particularly a most 3 Kelvin. It is thus possible to keep the temperature of the wood material panel within a narrow range. This results in less waste.

The target temperature preferably lies between 100° C. and 110° C., especially 102° C. and 108° C., if the panel thickness is between 5 and 6 mm. If the panel thickness is between 7 and 8 mm, the target temperature preferably lies between 121° C. and 131° C., preferably between 123° C. and 129° C. It has been proven that this enables the production of high-quality wood material panels.

The wood material panel hot press is preferably designed to produce a wood material panel with a panel thickness of at least 2.5 millimeters, especially at least 3.0 millimeters, preferably at least 5 millimeters. In particular, the wood material panel hot press is designed to produce a wood material panel with a maximum panel thickness of 8 mm, especially a maximum of 12 mm, preferably a maximum of 38 millimeters. With thin wood material panels, in particular with a panel thickness between 5 and 8 millimeters, which are preferably HDF panels, an incorrect selection regarding the process parameters will lead to an especially rapid creation of waste. The invention is therefore especially advantageous for the production of this type of wood material panel.

A wood material panel production device with a wood material panel hot press according to the invention and a saw and/or trimming system arranged behind the wood material panel hot press in the direction of material flow is also in line with the invention.

The wood material panel hot press preferably features a control unit. The control unit is preferably configured to automatically conduct a method according to the invention.

It is favorable if the operational steps given in this description are conducted at the start of pressing following a downtime and/or following a product change from one wood material panel format to another.

A method according to the invention preferably comprises the steps: a calculation of a discrepancy parameter, in particular a difference between a maximum temperature and a minimum temperature of the wood material panel. The discrepancy parameter is a measure of the inhomogeneity of the temperature of the wood material panel on the outlet side. For instance, the discrepancy parameter is determined from the temperature measured in a spatially resolved manner T(y), wherein the y coordinate is measured transversely to the direction of material flow.

The discrepancy parameter may, for example, be the variation or the standard deviation of the temperature distribution in the width direction. The discrepancy parameter may also be the difference between a maximum and minimum temperature of the wood material panel, for example. The data used for calculating the discrepancy parameter may be obtained from the measured raw temperature data obtained by way of temporal and/or spatial averaging across a predetermined range.

The discrepancy parameter should be understood especially to mean a value that describes the extent to which the temperature, which has been measured in a spatially resolved manner, deviates from the target temperature distribution.

The method preferably comprises the step: an emission of a warning signal if the difference exceeds a predetermined warning threshold value.

It is possible, but not necessary, for this warning signal to be perceptible to humans. In particular, it is also possible for the warning signal to be purely electric. It is also possible, but not necessary, that at least one process parameter of the wood material panel hot press changes as a result of the warning signal in such a way that the discrepancy parameter reduces. For instance, this may comprise a local change in the pressing force and/or a local change in the heat output and/or the temperature of the hot press.

The method preferably includes the steps (i) detection of an inhomogeneity of the press belt and (ii) suppression of the emission of the warning signal if the warning threshold value is exceeded due to the inhomogeneity. Such an inhomogeneity occurs, for example, as a result of the repair of the press belt via the removal and replacement of a defective section. In the area surrounding the joint between the exchanged section and the remainder of the press belt, a different transfer of heat from the press belt to the fiber cake occurs, which manifests itself in the local temperature of the wood material panel. A distinctive temperature pattern emerges, which appears once per circulation of the press belt. If the warning threshold value is exceeded as a result of this temperature pattern, no warning signal will be emitted as it does not constitute a process disruption.

The temperature pattern may be recognised by the fact that it occurs precisely once per circulation of the press belt and/or takes the shape of the replaced section. The temperature pattern is recognised, for example, by way of image recognition or manually identified once as an inhomogeneity; its position is then calculated using the circulation speed of the press belt and the amount of time that has elapsed since the last appearance of the temperature pattern.

The step which comprises the detection of the inhomogeneity preferably includes a (i) measurement of the temperature of the wood material panel on the outlet side of the wood material panel hot press over a period of time that is at least twice, preferably at least four times, a circulation time of the press belt, and (ii) an elimination of deviations from an average temperature which appear periodically over the circulation time. This renders it possible to identify such fluctuations in the temperature of the wood material panel.

For instance, the elimination of deviations from an average temperature which appear periodically over the circulation time may occur by conducting an initial Fourier transform, for example of the temperature data that is dependent on the time. This produces the spectrum of the temperature data. Within this spectrum, the components which belong to the circulation frequency of the press belt are filtered out and the resulting spectrum is then subjected to inverse Fourier transformation. This results in the temperature data which is only caused by the press belt.

The suppression of the emission of the warning signal may occur, for example, by correcting the temperature measured values by a temperature difference which is produced by the press belt. The spectrum of the corrected temperature measured values obtained in this way does not feature any components which belong to the circulation frequency.

The fact that the temperature measured values are corrected by a temperature difference may mean that the—if applicable, negative—temperature difference is added to the respective temperature measured value. The temperature difference is generally time-dependent (and periodic with the circulation frequency) and location-dependent in relation to the width coordinate perpendicular to the direction of material flow of the wood material panel.

It should be noted that it is possible, but not necessary, for the detection of the inhomogeneity to occur automatically. In particular, it is possible for the inhomogeneity to be flagged and the position of the differential temperature resulting from the inhomogeneity to be calculated, and the temperature measured values to be automatically corrected by the differential temperature.

According to a preferred embodiment, the regulation of the at least one process parameter on the basis of the temperature comprises the following steps: (i) input of the time and location-dependent temperature values as input variables into a neural network, wherein the neural network gives out process parameters as output variables, and the adjustment of these process parameters on the wood material panel production device, wherein the neural network is trained to minimize a deviation between the temperature measured values, which have preferably been measured with an infrared camera, and a predetermined target temperature distribution.

The target temperature distribution is, for example, the uniform temperature distribution that has the same value at each point in relation to a position along the direction of material flow, regardless of time. As the distance along the direction of material flow increases, the temperature may become lower, as the wood material panel cools.

In particular, the method includes the steps: an automatic adjustment of at least one process parameter, in particular of at least two process parameters, especially preferably at least three process parameters, by means of the control unit subject to the time-dependent temperature measured values, wherein the at least one process parameter is calculated by means of the neural network. The neural network preferably has at least one hidden layer, preferably at least three hidden layers.

The neural network has preferably been trained by means of deep learning. To this end, the time-dependent process parameters and time-dependent temperature measured values are used as inputs. The outputs are process parameters and are adjusted on the wood material panel hot press. The variable that is to be minimized is the deviation of the temperature values from the target temperature distribution.

BRIEF DESCRIPTION OF THE DRAWINGS

In the following, the invention will be explained in more detail by way of the attached drawings. They show FIG. 1 a schematic view of a wood material panel hot press according to the invention, FIG. 2 a measurement result of the temperature measurement using the temperature measurement device, and FIG. 3 a schematic horizontal cut through a wood material panel hot press, the structure of which essentially corresponds to the structure according to FIG. 1 but whose heat circuits are arranged next to one another.

DETAILED DESCRIPTION

Figure 1:
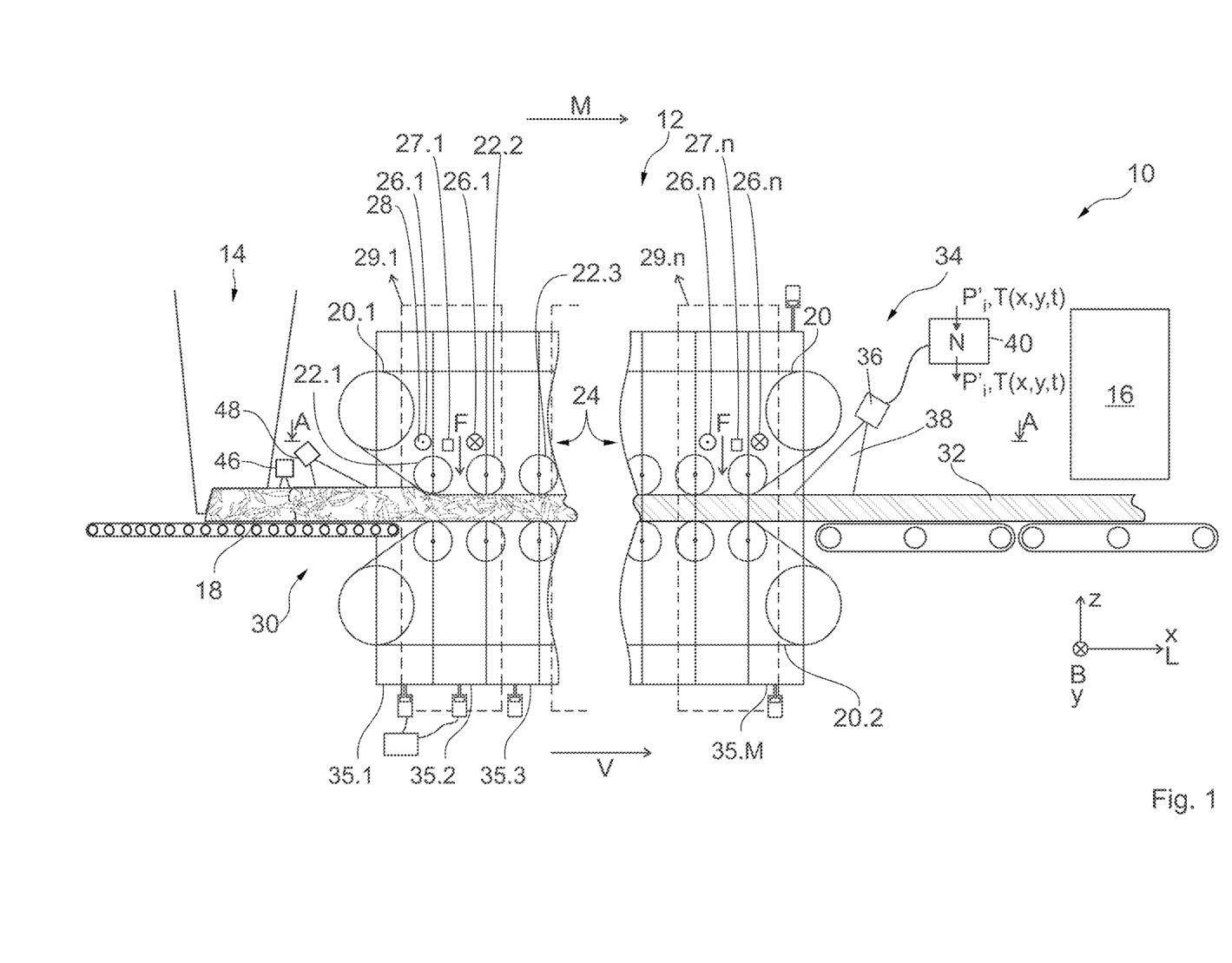

FIG. 1 schematically depicts a wood material panel production device 10 according to the invention with a wood material panel hot press 12, a spreader 14 (e.g. pendistor) that is arranged in front of the wood material hot press 12 in the direction of material flow and a sawing system 16 arranged behind (the hot press). The spreader 14 is designed to spread a continuous fiber cake 18 made of wood fibers, which have been coated with an adhesive, onto a circulating conveyor belt.

The wood material panel hot press 12 has a circulating first press belt 20.1 which is subjected to a pressing force $F_p$, for example by means of bars 22.1, 22.2, . . . . The press belt 20.1 is made of a metal sheet, such as stainless steel. There is a break in the wood material panel hot press 12 as it features a large number of bars. The fiber cake 18 lies on a second circulating press belt 20.2, which circulates at the same speed as the first press belt 20.1.

The wood material panel hot press 12 features a heating device 24, by means of which the press belt 20 can be heated by means of pipes 26.1, 26.2, . . . . A heat transfer fluid 28 circulates in the pipes 26, this fluid being heated by a heat generator—not depicted—such as a boiler, which is a component of the heating device 24. The heat transfer fluid 28 transfers the heat to the respective press belt 20.1, 20.2 via heating plates and/or rolling bars; from there, it is transferred to the fiber cake 18.

Figure 3:
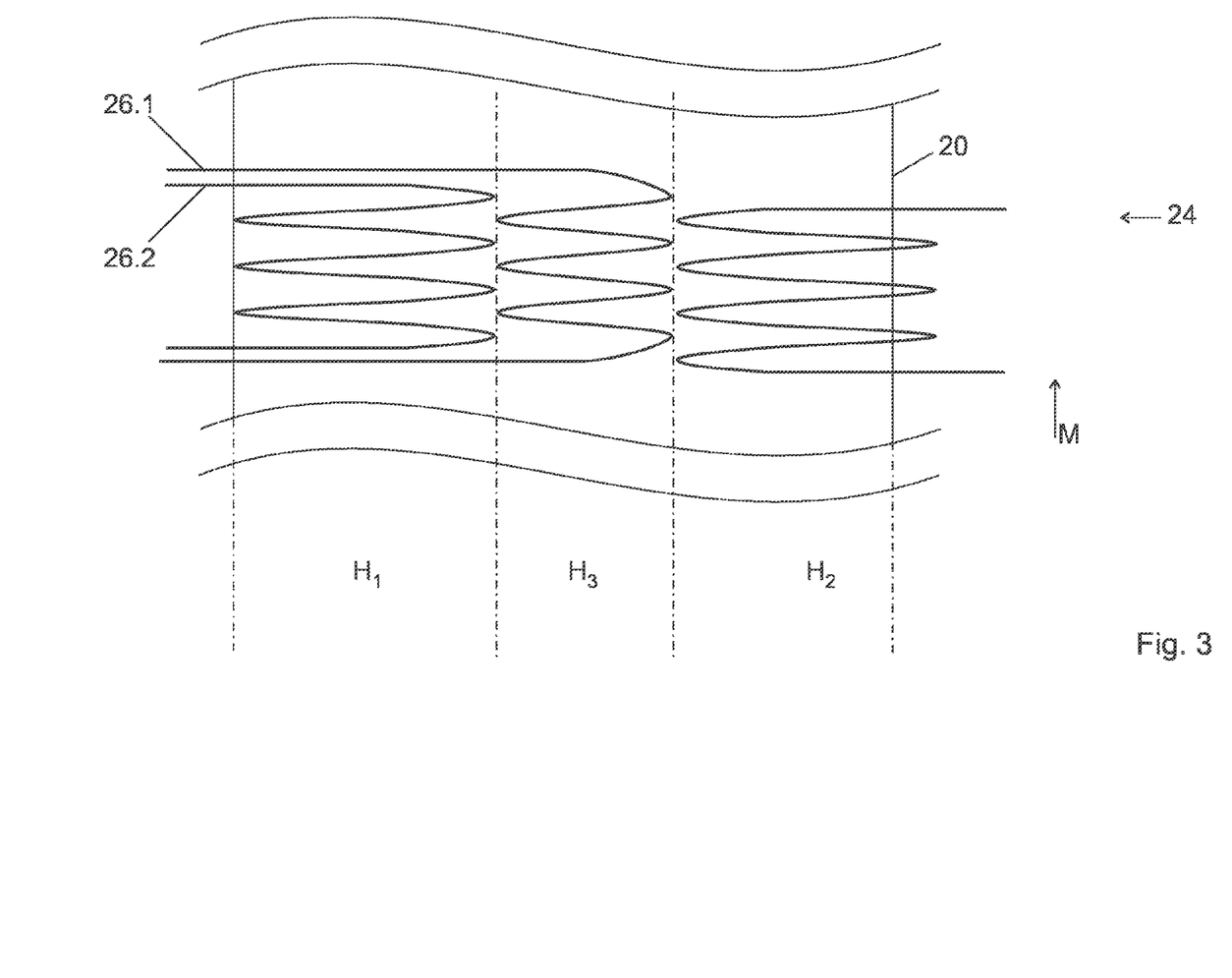

In the present embodiment, the heating device 24 comprises several heating circuits 29.1, . . . , 29.n, wherein n is n=3, 4, 5, 6, 7, 8 or 9 for example. It is possible to have more heating circuits. The heating circuits 29.n are configured to heat the fiber cake 18, across its entire width in the present case, and are arranged one after another in the direction of material flow M. However, it is alternatively or additionally possible for two heating circuits to be arranged adjacent to one another, as shown in FIG. 3.

For each heating circuit 29.1, . . . , 29.n, the wood material panel hot press 12 has at least one temperature probe 27.i (i=1, . . . , n). In the present case, each heating circuit 29.i has three temperature probes: one for identifying the flow temperature (temperature upon entering the heating circuit), one for the return flow temperature (temperature upon leaving the heating circuit) and one for the temperature of the pressing sheet.

The fiber cake 18 continuously enters the continuously running wood material panel hot press 12 on an inlet side 30, where it is pressed to become a wood material 32, which leaves the wood material panel press 12 on an outlet side 34.

The wood material panel hot press 12 has a number of frames 35.1, 35.2, . . . , 35.M, wherein M=35 for example. The frame 35.m can be used to adjust the press gap in the respective area of the frame 35.m at at least two, preferably three or more, points along the width of the wood material panel, i.e. in the vertical direction of the wood material panel hot press 12. This means, for instance, that a greater or smaller pressing force and/or a smaller press gap can be set on the left in terms of the direction of material flow than on the right.

In particular, the bars 22.i themselves, or components that transfer a pressing force onto the bars 22.i, can each be attached to a respective frame 35.m. By changing the position of a frame 35.m or the position of the component relative to the frame 35.m, it is possible to change the pressing force which is being applied by the press belt 20 to the fiber cake or the wood material panel being produced.

A temperature measurement device 36 in the form of an infrared camera is arranged on the outlet side 34. This camera's field of vision 38 comprises the wood material panel 32 on the outlet side 34 of the wood material panel hot press 12.

Alternatively, the temperature measurement device 36 may comprise a number of contactless temperature sensors which are arranged at a distance from one another in terms of a width direction B.

The temperature measurement device 36 is connected to a control unit 40, which evaluates the temperature measurement data from the temperature measurement device 36. In the present case, the control unit 40 is also connected to the temperature probes 27.i via cables (not depicted).

Figure 2:
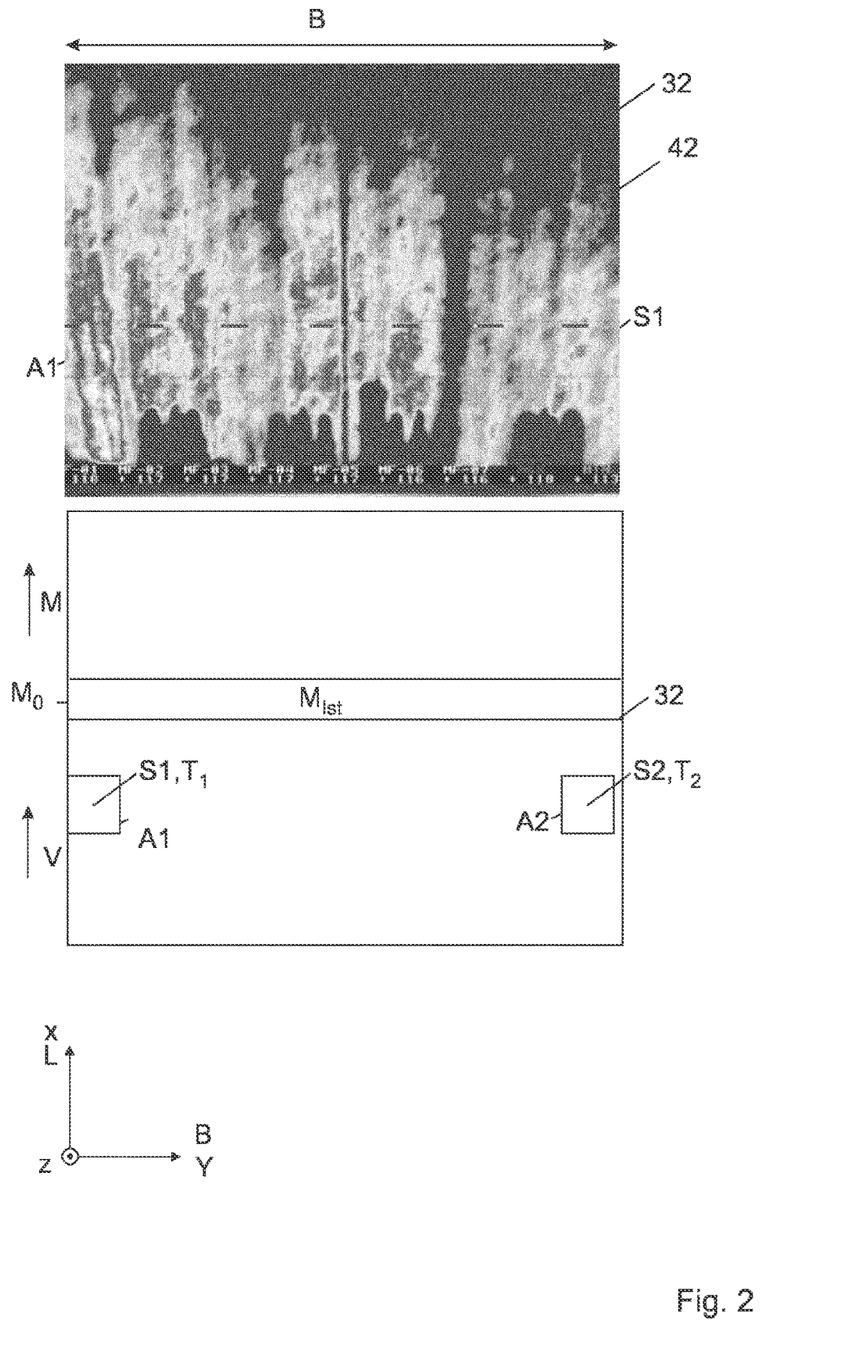

FIG. 2 shows an image 42 that has been captured using the temperature measurement device 36. It should be recognized that the temperature T=T (x, y) is measured in two spatial directions x, y. The temperature T is recorded at a number of points $(x_j, y_j)$ (j=1, 2, . . . , N) in the width direction B of the wood material panel 32. Here, it is preferable if N>2, in particular N>5, preferably N<1000. In the present case, several measured values for the temperature T in a longitudinal direction L are also recorded consecutively. The method of temperature measurement shown in FIG. 2 by way of an infrared camera is especially advantageous because, as depicted in FIG. 2, it results in a detailed image of the temperature T(x, y) of the wood material panel 32.

The control unit 40 (see FIG. 1) captures, for example, a first lateral temperature $T_1$, which is produced as an arithmetic mean across an area A1 in the present case. The lateral temperature $T_1$ is allocated to a first point S1. In the present case, the point S1 is the mid-point of the area A1. The point S1 is situated in a left-hand lateral area of the wood material panel 32, as can be seen in the lower partial image, which shows the same point on the wood material panel 32 and has been added for the sake of clarity.

In addition, a second lateral temperature $T_2$ at a second point S2 is identified, which lies in a right-hand lateral area of the wood material panel 32. The second temperature $T_2$ is also identified by taking an average across a pixel range of the temperature measurement device 36.

The control unit 40 identifies a discrepancy parameter U, which may comprise the temperature $U=\Delta T=|T_1-T_2|$, for instance. If the discrepancy parameter U exceeds a predetermined warning threshold value $U_{Warn}$, the control unit 40 will amend a process parameter P. This process parameter P may refer to the local pressing force p=p (y) for example, with which the bars 22.i=1, 2, . . . (see FIG. 1) press locally on the press belt 20. The process parameter P may also be a heat output $P_{Heiz}$ that the heating device 24 transfers to the press belt 20.

By taking the average across the complete width B at a predetermined point along the direction of material flow M, such as at the height $M_0$, it is possible to determine an (average) actual temperature $T_{Ist}$. Should this actual temperature $T_{Ist}$ deviate from a predetermined target temperature $T_{Soll}$ by more than $\Delta T_o$ above it or $\Delta T_u$ below it, the control unit 40 can emit a corresponding warning signal. A machine operator can then either increase or reduce a feed speed v. Alternatively, this is done automatically. The feed speed v describes the speed at which the wood material panel 32 (see FIG. 1) moves in the vicinity of the outlet side in the direction of material flow.

FIG. 3 schematically depicts a horizontal partial cross-section A-A through a material wood panel hot press 12 according to the invention which, apart from the arrangement of the heating circuits, is constructed in the same way as the wood material panel hot press 12 according to FIG. 1. It should be recognized that the heating device comprises a first heating strand, with which a first heated area $H_1$ can be heated, a second heating strand, with which a second heated area $H_2$ can be heated, and a third heating strand, with which a third heated area $H_3$ can be heated. Alternatively, two or four or more heated areas $H_i$ may be provided. It is also possible for there to be more then one heating strand per heated area. The number of heated strands may be different or the same for different heated areas. The heated areas are arranged adjacent to one another in the direction of material flow M and collectively heat the full width of the press belt 24. The temperature $T_i$ or the heated area $H_i$ and/or its heat output $P_i$ can be adjusted independently from one another.

A method according to the invention is executed, for instance, by initiating a downtime of at least 15 minutes for the wood material panel hot press, for example for maintenance purposes or a product change. To begin with, less heat than average as witnessed during normal operation is supplied. The wood material panel begins by exhibiting a higher than average temperature as witnessed during normal operation on the outlet side. For example, for a wood material panel which is, for instance, 7.6 mm thick, the temperature averaged across the full width is 118±1° C. In this example, the feed speed is v=510 mm/sec.

As a result of the defective heat supply, the temperature of the wood material panel decreases once again—to 114° C. in the example—and it may result in critical temperature shortfalls if the temperature is not checked; these shortfalls may result in splitters, and therefore waste. In the example, the feed speed is therefore preferably automatically reduced to v=445 mm/sec. The flow temperature of the press and the heating plate temperature increase; however, the surface temperature of the panels does not.

As the panel temperature increases, the feed speed increases—preferably automatically—such that the temperature averaged across the full width reaches the target temperature $T_{Soll}$ 124±1° C. and the feed speed has reached its maximum possible value or a target value v=530 mm/sec, for example. This often takes up to 30 minutes.

A method according to the invention is also executed by first of all changing the panel thickness of the wood material panel. Different pressing temperatures and different surface temperatures are required for different panel thicknesses. For instance, the temperature averaged across the full width of a 12 mm-thick panel is 126±1° C. and 110±1° C. with a panel thickness of 5.5 mm. The heat output of the press must therefore be adapted to the new production. However, depending on the situation, the heat output required can only be roughly estimated.

Therefore, during the production of the wood material panel with a smaller or greater panel thickness, the heat output and/or the feed speed is first of all adjusted during ongoing production such that the temperature averaged across the full width is gradually reduced by 5 to 7° C. The panel thickness is then adjusted. The feed speed v is preselected using the temperature average across the full width; the feed speed v and the heat outputs P of the individual heating circuits are then adjusted using the temperature.

Within the scope of a method according to the invention, a discrepancy parameter U in the form of a maximum difference $\Delta T_B$ is preferably calculated automatically by the control unit 40, which may comprise several separate units. To this end, the temperature values T(y) are grouped into at least five, especially at least ten—preferably equidistant—evaluation ranges $A_j$. An evaluation range is, for example, a two-dimensional interval.

The evaluation ranges $A_j$ preferably form, in the mathematical sense, a partition of the measured values across at least 80%, particularly at least 90%, of the full width of the wood material panel. However, it is also possible that the total of all the evaluation ranges does not encompass the entire width of the wood material panel, but rather at least 50%, at least 60%, at least 70% or at least 80%, for example.

The mean of the temperature within each evaluation range $A_j$ is subsequently calculated. The evaluation range temperatures obtained in this way are used to calculate the maximum difference $\Delta T_B$ as a discrepancy parameter U8

If the discrepancy parameter U exceeds a predetermined warning threshold value of $U_{Warn}$=3° C., for instance, it may lead to an increase in differences in panel quality across the direction of material flow. This is countered by increasing a pressing force p on the cooler side.

This enables, for example, a reduction in the discrepancy parameter U from 4° C. to 1° C. by means of a pressure equalization of 20%-50% of the specific pressing force present in a rear high pressure area of the continuous press in the direction of material flow.

For instance, if a discrepancy parameter of U=4° C. is measured during the production of a wood material panel with a panel thickness of 5.5 mm, wherein the higher temperature is in the right-hand section of the wood material panel in the direction of material flow and wherein the remaining evaluation range temperatures differ by less than 1° C., the pressing force in the right-hand area, in particular the right-hand high pressure area, of the heat press will be increased by 35%. This causes the discrepancy parameter to be reduced to below 1° C.

Within the scope of a method according to the invention, the process parameter in the form of the total heat output $P_{Heiz, gesamt}$ and/or a heat output of a first, second or several heating circuits 29.*j* is preferably increased if the average temperature of the wood material panel is lower than the predetermined target temperature. This is especially pertinent if a feed speed has a predetermined maximum speed $v_{max}$.

For example, if a panel thickness is 7.6±0.5 millimeters, the target temperature $T_{Soll}$=123±1° C. and v=$v_{max}$=540 mm/sec. If the temperature averaged across the full width of the wood material panel is now 118° C., for instance, the total heat output $P_{Heiz, gesamt}$ is increased, preferably by increasing the flow temperature. In the present example, the flow temperature $T_{in,j}$ is increased by 2° C., for instance, for at least one heating circuit 29.*j*, but preferably for two or more heating circuits. As a result, the temperature approaches the target temperature in such a way that the discrepancy parameter U falls below the warning threshold value. The steps indicated can be conducted automatically without a person receiving a warning signal.

FIG. 1 shows that at least some of the frames 35.*m*, preferably a majority of the frames 35.*m*, can be subjected to a force $F_{p,m}$ by means of a respective actuator 44.1, 44.2, . . . . The actuators 44.*m* may refer, for instance, to hydraulic cylinders, which are subjected to force by way of a schematically depicted hydraulic pressure supply. The actuators $44.m$ are designed in such a way that the individual forces $F_{p,j}$ may be different for different actuators. Each of pressing forces $F_{p,m}$ represents a process parameter $P_m$ that can be individually adjusted by the control unit 40. The heat outputs of each heating circuit $29.i$ or the flow temperature of the heating fluid are also further process parameters $P_i$. They can also be adjusted by the control unit 40. The wood material panel hot press 12 also features a moisture sensor 46 for measuring a level of moisture in the fiber cake 18 prior to it entering the wood material panel hot press 12. The moisture sensor 46 is also connected to the control unit 40.

Furthermore, it is beneficial if the wood material panel hot press 12 has a second infrared camera which captures the temperature of the fiber cake 18 prior to its entry into the wood material panel hot press 12. The second infrared camera 48 is also connected to the control unit 40.

The control unit 40 features a neural network into which the process parameters $P_i$ enter as input variables. In addition, the spatially and temporally resolved measured values of the temperature $T(x,y,t)$ enter the neural network N as input variables. The neural network N is then taught that the discrepancy parameter U is to be as small as possible. The process parameters $P_i$ calculated by the neural network are continuously communicated to the respective components of the wood material panel hot press via a wired connection, or communicated wirelessly and adjusted there (on the hot press).

Figure 4:
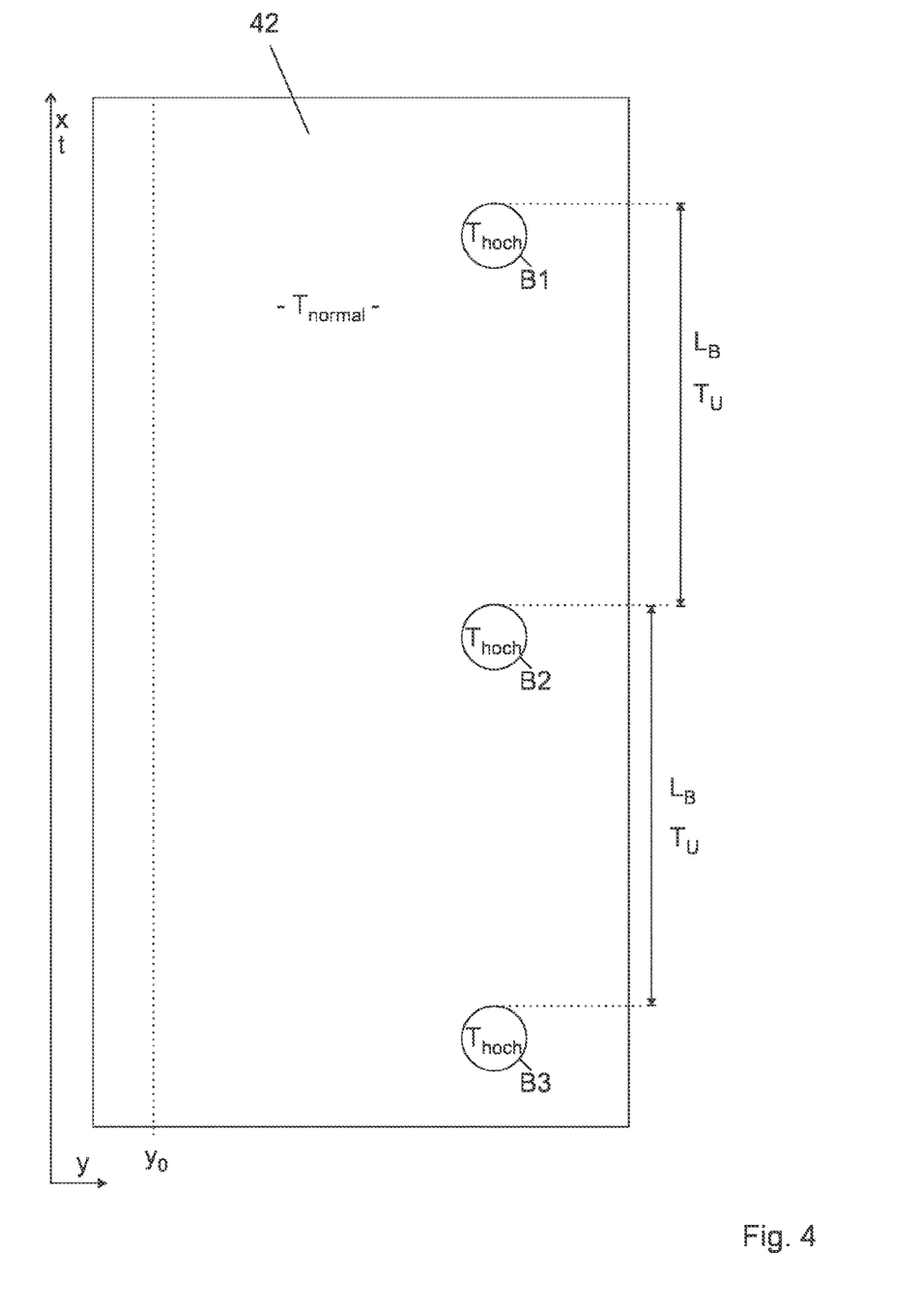
FIG. 4 shows schematically how an inhomogeneity of the press belt of a wood material panel hot press according to FIG. 1 is reflected in the temperature measured values.

FIG. 4 shows a schematic image 42 of a temperature measurement. It is to be assumed that the temperature is at a high value $T_{hoch}$ in areas B1, B2, B3 only and at a normal temperature $T_{normal}$ in all other areas. The areas B1, B2, B3 with the higher temperature $T_{hoch}$ are caused by an inhomogeneity in the press belt 20.1 (see FIG. 1). For instance, the inhomogeneity may be caused by the fact that a component of the press plate was defective and removed. The resulting gap was closed with a replacement part and the surface of the press plate smoothed.

In the present example, the thermal conductivity of the exchanged part of the press plate is greater, resulting in a higher temperature. The increased temperature is irrelevant to the quality of the wood material panel produced. However, if the temperature fluctuates, it can easily come to pass that a predetermined target temperature is briefly exceeded in one of the areas B. This would cause a warning signal to be emitted although the quality of the wood material panel is not at risk.

To avoid such an occurrence, the temperature increase in the areas B is factored out. To this end, a Fourier transform is conducted for each y position, such as position $y_0$. It should be noted that it is not relevant whether these Fourier transforms are conducted in with respect to the x-coordinates or to the complementary time coordinates, as the feed speed at which the fiber cake moves forward is fundamentally constant. Since the increase in temperature is caused by an inhomogeneity of the press belt, it repeats at regular intervals which correspond to the belt length $L_B$ of the press belt. A circulation time $T_U$, which the press belt requires for one circulation, is allocated to the press belt.

The components which can be allocated to the belt length $L_B$ are eliminated in the spectrum of the Fourier transforms calculated in this way. If a Fourier transform in time is conducted, the frequency components that can be allocated to the circulation frequency $f_U$ are eliminated, wherein the circulation frequency $f_U$ is the inverse of the circulation time $T_U$. An inverse Fourier transform is then executed on the corrected spectrum obtained in this manner This temperature signal no longer contains any components caused by inhomogeneities in the press belt. The wood material panel hot press is adjusted using the resulting corrected temperature data.

Figure 5:
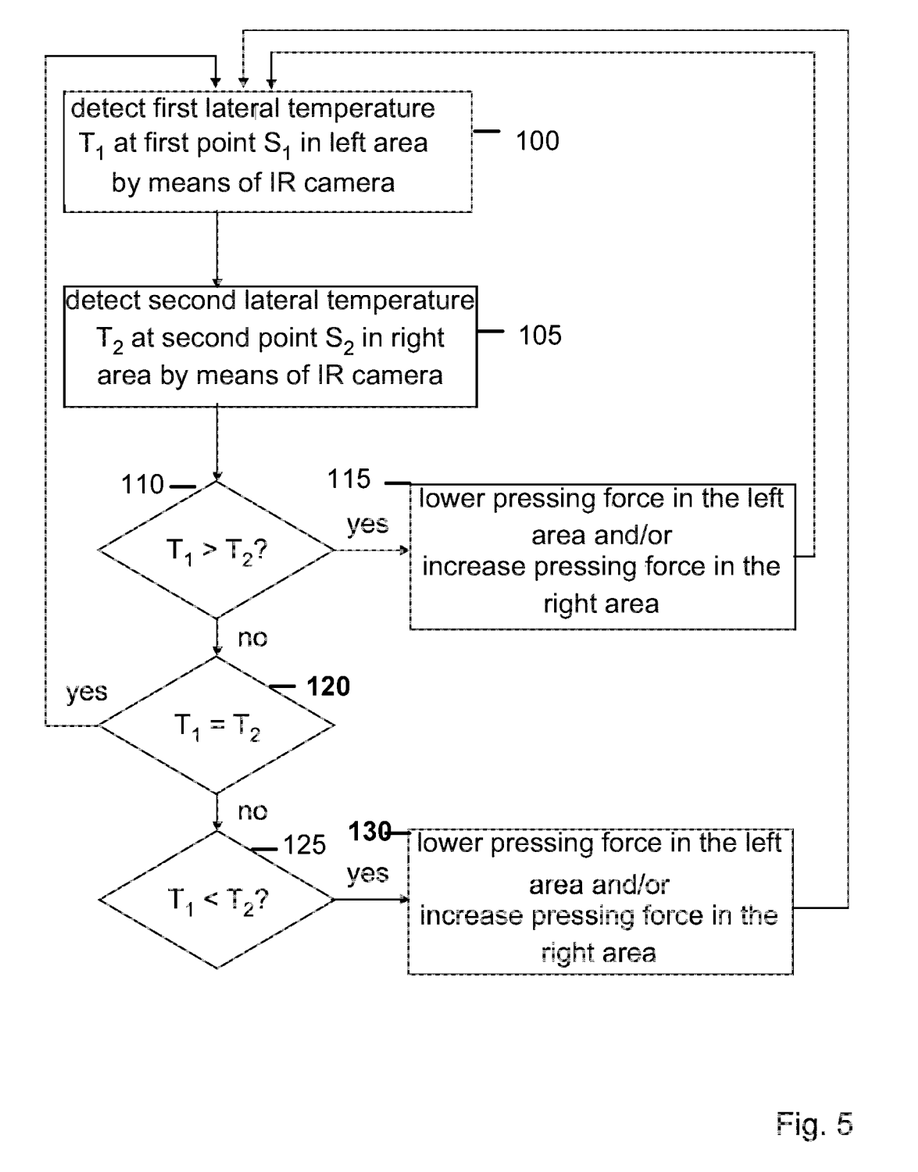
FIG. 5 shows a flow diagram of the methods described herein.

FIG. 5 shows a flow diagram of the methods described herein. At step 100, the process detects a first lateral temperature $T_1$ at a first point $S_1$ in a left area by means of IR camera, for example. At step 105, the process detects a first lateral temperature $T_2$ at a first point $S_2$ in a right area by means of IR camera, for example. At step 110, a determination is made as to whether $T_1 > T_2$. If yes, at step 115, the process lowers the pressing force in the left area and/or increases pressing force in the right area. The process then reverts back to step 100. At step 110, if the determination is negative, at step 120, a determination is made as whether $T_1 = T_2$ and, if yes, the process reverts back to step 100. If not, the process proceeds to step 125, where a determination is made as to whether $T_1 < T_2$. If yes, at step 130, the process lowers pressing force in the left area and/or increases pressing force in the right area. The process then reverts back to step 100.

The invention claimed is:

1. A method for operating a wood material panel hot press which comprises an inlet side and an outlet side, and presses a blank supplied from the inlet side to produce a wood material panel, comprising:
   automatic, contactless, time-resolved measurement of a temperature of the wood material panel on the outlet side, and
   adjustment of at least one process parameter of the wood material panel hot press based on the temperature of the wood material panel,
   wherein the adjustment of the at least one process parameter of the wood material panel hot press comprises increasing a pressing force on a side with a lower temperature, and/or decreasing a pressing force on a side with a higher temperature, and
   wherein the pressing force on the side with the lower temperature is different than the pressing force on the side with the higher temperature.

2. The method according to claim 1, wherein the at least one process parameter comprises a feed speed of the blank.

3. The method according to claim 1, wherein the at least one process parameter comprises a heat output.

4. The method according to claim 1, wherein the at least one process parameter comprises a temperature of at least one component of the wood material panel hot press.

5. The method according to claim 4, further comprising:
   detecting of a first lateral temperature of a first point in a left-hand lateral area of the wood material panel,
   detecting of a second lateral temperature of a second point in a right-hand lateral area of the wood material panel, and
   adjusting of at the at least one process parameter of the wood material panel hot press such that the first lateral temperature approaches the second lateral temperature.

6. The method according to claim 5, further comprising:
   calculating a difference $\Delta T_g$ between a maximum temperature and a minimum temperature of the wood material panel, and
   emission of a warning signal if a discrepancy parameter exceeds a predetermined warning threshold value.

7. The method according to claim 6, wherein the detection of the first lateral temperature and the detection of the second lateral temperature is carried out by an infrared camera.

8. A method for operating a wood material panel hot press which comprises an inlet side and an outlet side, and presses a blank supplied from the inlet side to produce a wood material panel, comprising:
- automatic, contactless, time-resolved measurement of a temperature of the wood material panel on the outlet side,
- adjustment of at least one process parameter of the wood material panel hot press on a basis of the temperature of at least one component of the wood material panel hot press,
- detecting of a first lateral temperature of a first point in a left-hand lateral area of the wood material panel,
- detecting of a second lateral temperature of a second point in a right-hand lateral area of the wood material panel,
- adjusting of at the at least one process parameter of the wood material panel hot press such that the first lateral temperature approaches the second lateral temperature, calculating a difference ATg between a maximum temperature and a minimum temperature of the wood material panel, and
- emission of a warning signal if a discrepancy parameter exceeds a predetermined warning threshold value,
- wherein the detection of the first lateral temperature and the detection of the second lateral temperature is carried out by an infrared camera, and
- wherein the adjustment of the at least one process parameter on the basis of the temperature comprises:
- entry of time and location-dependent temperature values as input variables into a neural network, wherein the neural network gives out process parameters as output variables, and
- adjusting of the process parameters on the wood material panel production device,
- wherein the neural network is trained to minimize the difference $\Delta T_g$ between the maximum temperature and the minimum temperature of the wood material panel.

9. A method for operating a wood material panel hot press which comprises an inlet side and an outlet side, and presses a blank supplied from the inlet side to produce a wood material panel, comprising:
- automatic, contactless, time-resolved measurement of a temperature of the wood material panel on the outlet side, and adjustment of at least one process parameter of the wood material panel hot press based on the temperature of the wood material panel, the at least one process parameter being at least one position of a frame to which a press belt is fixed which adjusts a press gap at least at two points along a width of the wood material panel in a vertical direction of the wood material panel hot press in order to apply a greater pressing force on a lower temperature side or smaller pressing force on a higher temperature side and/or a smaller press gap on a lower temperature side or a larger press gap on the higher temperature side to influence a temperature and/or the temperature distribution of the wood material panel on the outlet side.

10. A wood material panel hot press for producing a wood material panel, wherein the wood material panel hot press comprises:
- an inlet side and an outlet side, the inlet side designed to press a blank in order to form a wood material panel,
- a temperature measurement device to automatically measure temperature of the wood material panel on the outlet side in a spatially resolved manner, and
- a control device configured to automatically carry out:
  - detection of a first lateral temperature of a first point in a left-hand lateral area of the wood material panel,
  - detection of a second lateral temperature of a second point in a right-hand lateral area of the wood material panel, and
  - adjustment of at least one process parameter of the wood material panel hot press such that the first lateral temperature approaches the second lateral temperature,
- wherein the adjustment of the at least one process parameter on the basis of the temperature comprises:
  - entry of time and location-dependent temperature values as input variables into a neural network, wherein the neural network gives out process parameters as output variables, and
  - adjusting of the process parameters on the wood material panel production device,
- wherein the neural network is trained to minimize the difference $\Delta T_g$ between a maximum temperature and a minimum temperature of the wood material panel.

* * * * *